US005475230A

United States Patent [19]

Stumpf et al.

[11] Patent Number: 5,475,230

[45] Date of Patent: Dec. 12, 1995

[54] X-RAY CASSETTE

[75] Inventors: Friedrich Stumpf, Munich, Germany; Bavo Muys, Morstel; Jurgen Van Limbergen, Mechelen, both of Belgium

[73] Assignee: Agfa-Gevaert AG, Leverkusen, Germany

[21] Appl. No.: 345,590

[22] Filed: Nov. 28, 1994

[30] Foreign Application Priority Data

Dec. 1, 1993 [DE] Germany .......................... 43 40 981.4
Dec. 6, 1993 [DE] Germany .......................... 43 41 489.3

[51] Int. Cl.[6] .............................. H05F 1/02; G03B 42/04

[52] U.S. Cl. ........................ 250/484.4; 250/584; 378/182

[58] Field of Search ................................ 250/484.4, 584, 250/581; 378/182, 187, 188, 186

[56] References Cited

U.S. PATENT DOCUMENTS 4,386,431 5/1983 Van Landeghem et al. .
4,759,679 7/1988 Muller .
4,893,011 1/1990 Bauer et al. .
4,960,994 10/1990 Müller et al. .......................... 250/584
5,025,465 6/1991 Bauer et al. .......................... 250/484.4
5,086,446 2/1992 Bauer et al. .......................... 378/188

FOREIGN PATENT DOCUMENTS 0026358 4/1981 European Pat. Off. .
0347647 12/1989 European Pat. Off. .

*Primary Examiner*—Constantine Hannaher
*Assistant Examiner*—Virgil O. Tyler
*Attorney, Agent, or Firm*—Karl F. Milde, Jr.

[57] ABSTRACT

An x-ray cassette (1) to accommodate photosensitive material in sheet form, especially a phosphor film (2), having a cover part (**1*b*), a bottom part (1*a*) and side parts (1*c*) joined thereto, the cover part, bottom part and side parts being made of plastic and closing off the cassette interior in a light-tight manner. The cassette has at least one electrically conductive element (6) which covers at least 20% of the surface of the cassette (1**).

9 Claims, 2 Drawing Sheets

X-RAY CASSETTE

BACKGROUND OF THE INVENTION

An x-ray cassette for the accommodation of photosensitive material in sheet form, especially an excitable phosphor sheet, comprises a cover part, a bottom part and side parts joined thereto. The cover part, bottom part and side parts are made of plastic and enclose the cassette interior in a light-tight manner.

An x-ray cassette of this kind is disclosed, for example, in German Patent Publication No. OS 30 43 070 A1. The cassette therein described serves to contain an x-ray film. A film inserted therein is enveloped in a light-tight manner by a cover, a bottom and side parts made of plastic. Image intensifier sheets are provided adjacent to the x-ray film, on at least one of the two halves of the cassette, which convert the x-rays to visible light and expose the x-ray film. The x-ray film is exposed both by an image intensifier on the cover side and by another one on the bottom side.

The x-ray cassette is automatically loaded and unloaded under darkroom conditions. For this purpose various types of apparatus are already known, for example as disclosed in the German Patent No. 36 10 660 C1. An x-ray film cassette to be loaded or unloaded is inserted into the apparatus therein described, opened under light-tight conditions, and the film is removed from the cassette by a suction device. The cassette is then reloaded with a fresh, unexposed film of a size fitting the cassette, and the cassette is reclosed and dispensed at the front of the apparatus.

For some time processes have also been known in which excitable phosphorus screens are used and exposed to the x-radiation, in place of the conventional x-ray film and intensifying screen. For this purpose various kinds of cassettes are employed, which are of a construction very similar to those used for x-ray photographs with x-ray films. A cassette for excitable phosphor screens and a method of using it is described, for example, in the German Patent Publication No. OS 37 31 203 A1. In the method used with this cassette the screen is removed from the cassette after x-ray exposure, made to luminesce by means of a laser beam scanner, and the light emitted is converted to digital electronic image signals. The image information is then erased on the film by exposing it to appropriate radiation. The digital image signals are stored in a central memory and subjected to digital image processing in which, for example, certain image information can be filtered out. The picture can then be displayed by a peripheral device (video monitor, printer or film reader). In the case of x-ray photography, both with x-ray film and with excitable phosphor sheets, the problem often arises that, when the cassette is loaded or unloaded, dust enters the cassette interior and collects in the cassette. These grains of dust can result in damage to the film or sheet and can also produce unwanted images on film or sheet. Such artifacts are undesirable especially in medical diagnosis when the x-ray images are evaluated.

SUMMARY OF THE INVENTION

The principal object of the present invention is to improve an x-ray cassette of the type described above such that the picture quality of the x-ray images photographed with the cassette is less subject to impairment by dust.

This object, as well as other objects which will become apparent in the discussion that follows, are accomplished, in accordance with the present invention, by providing at least one electrically conductive element that comprises at least 20% of the surface of the cassette.

The invention is based on the knowledge that dust and foreign particles deposited in the cassette are retained in the cassette by electrostatic attraction. Cassettes made of plastic are electrostatically charged by contact or rubbing with materials having triboelectric properties different from the plastic of the cassette. In the daily use of x-ray cassettes this occurs, for example, when the cassette comes in contact with nylon clothing, rubber feed rolls in the loading and unloading apparatus, packaging material, handling tables, leather coverings on equipment, etc.

The electrostatic charge on the cassette produces sometimes strong electrical fields of up to more than 10 kV/m in the cassette. These fields polarize dust particles in the air and hold them against the cassette walls.

Inasmuch as means are provided on the cassette according to the invention which allow electrical charges to flow directly from the cassette into the ambient air as to earth via grounding, the following additional advantages are obtained:

Adhesion of the film to the cover by electrostatic attraction is prevented by the invention, because the film takes on little or no electrical charge. This assures that, when the cassette is automatically loaded and unloaded, the film remains positioned on the cassette bottom when the cassette is opened. From there it can then be safely removed by suction conventional devices.

Electrical flashovers when the cassette is touched by an operator are also prevented by the invention.

Damage to electrical components which come in contact with the cassette during automatic loading and unloading are likewise prevented, because the cassette does not have any excess charge that might pass through these parts.

The greater the conductive area of the cassette, the better will be the achieved effect. Therefore it is especially advantageous to make the surfaces surrounding the exterior of the cassette conductive, or even to make the entire cassette of conductive plastic. Antistatic materials, known in themselves, are appropriate for this purpose.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
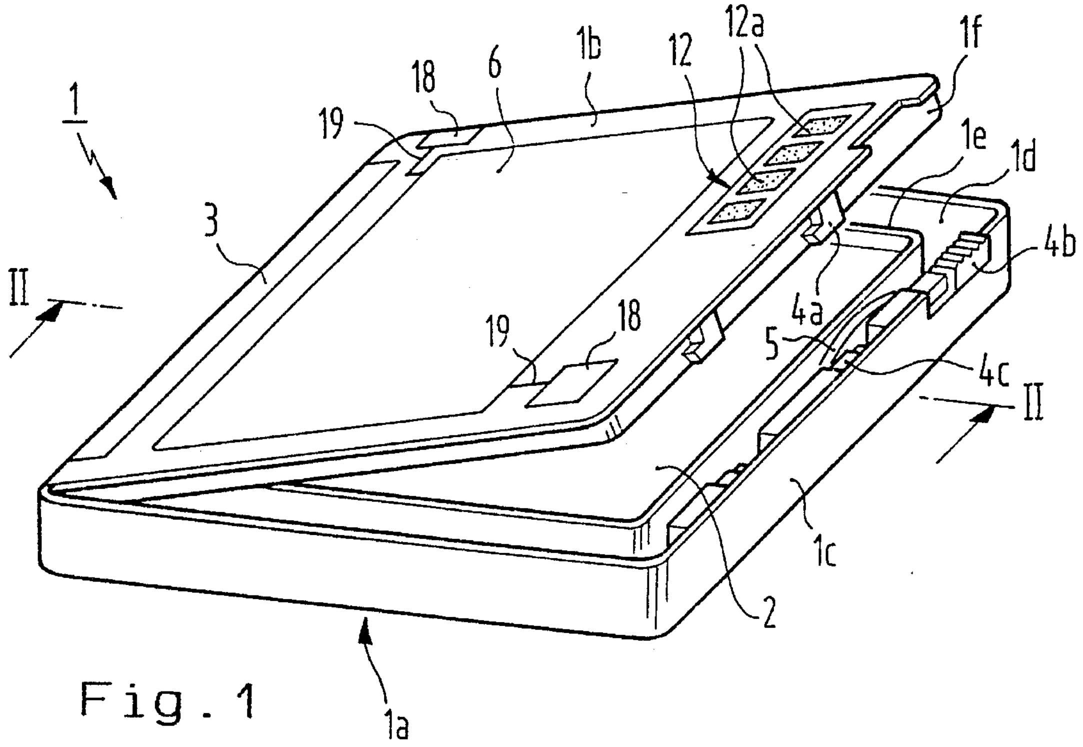
FIG. 1 is a perspective view of an x-ray cassette according to the invention.

The preferred embodiments of the present invention will now be described with reference to FIGS. 1–3 of the drawings. Identical elements in the various figures are designated with the same reference numerals.

In FIG. 1 there is shown an x-ray cassette 1. Its lid 1*b* is joined to a bottom part 1*a* by a hinge 3. Sides 1*c* make the interior of the cassette 1 light-tight. Bottom 1*a*, lid 1*b* and sides 1*c* and hinge 3 consist of plastic. At the front side, opposite hinge 3, is a sliding lock 4*b* which is mechanically connected to a locking pin 4c. When the cassette 1 is in the closed state, a hook 4a fastened to the lid engages the pin. Inside of the cassette 1 is a continuous rectangular frame 1e, which together with the outer sides 1c of the cassette forms a channel 1d. A lip 1f fastened to the cassette lid 1b reaches into this channel 1d, so that lip 1f and channel 1d form a light-tight labyrinth. When the cassette 1 is closed, the lip if depresses a leaf spring 5 lying on the cassette bottom within channel 1d, so that the lid 1b will snap upward by itself when the closure mechanism 4a, 4b, 4c is unlocked. A phosphor sheet 2 is placed in the inner frame 1c of the cassette 1.

In the cassette lid 1b there is also a digital semiconductor memory 12 which has four electrical contacts 12a. When a phosphor sheet is loaded or unloaded into or out of the cassette 1 in an apparatus according to the German Patent Publication No. OS 37 31 203 A1, data can be read or erased in the semiconductor memory or entered into it.

Lid 1b, sides 1c and bottom 1a consist of hard, dissipative ABS plastic with a very high specific surface resistance ($10^{15}$ ohms). The hinge 3 is made of softer plastic than the extruded shape. It can easily be deformed along a line about which the lid 1b can be swung to open or close the cassette 1. An antistatic film 6 is adhered with a conductive transfer cement to the lid 1b.

Figure 2:
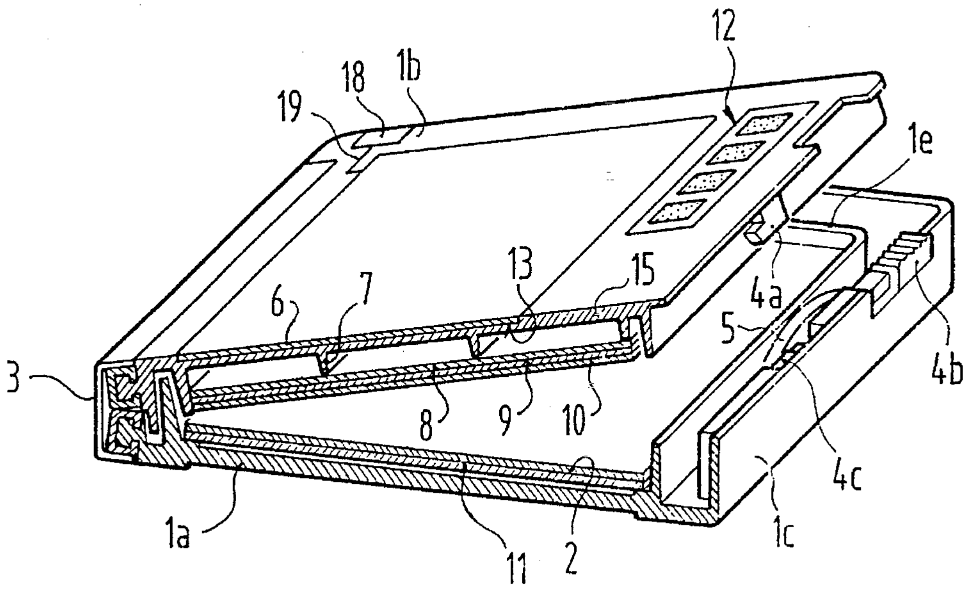
FIG. 2 a perspective view of the cassette of FIG. 1 taken along the section line II—II.

FIG. 2 shows the cassette 1 represented in FIG. 1 along the section line II—II. The antistatic film 6 is cemented into a recess in the cassette lid 1b, so that the surface of film 6 is coplanar with the surface of the lid 1b. The recess 13 is milled into the lid 1b, but it can just as easily be created during production of the cassette 1 approximately configuring the injection molding die.

The lid 1b is formed in a sandwich-like manner as is well known in the art. A cover plate 15 is solidly joined to reinforcing ribs 7 on which a plastic plate 8 is fastened. This design assures that the cassette 1 will be secure against warping, on the one hand, and light-weight on the other. A lead sheet 9 is fastened flat against the plastic plate 8. The lead sheet is covered by a thin, nonconductive polycarbonate film 10. Its thickness is only 125 micrometers. The lead sheet 9 prevents x-radiation, which is scattered on the lid 1b and on ribs 7, from being reflected onto the phosphor sheet 2. Thus a high picture quality is assured. The phosphor sheet 2 lies on the bottom on a thin, soft pressure plate 11 which absorbs only little x-radiation. Also the bottom 1a absorbs very little x-radiation.

Figure 3A:
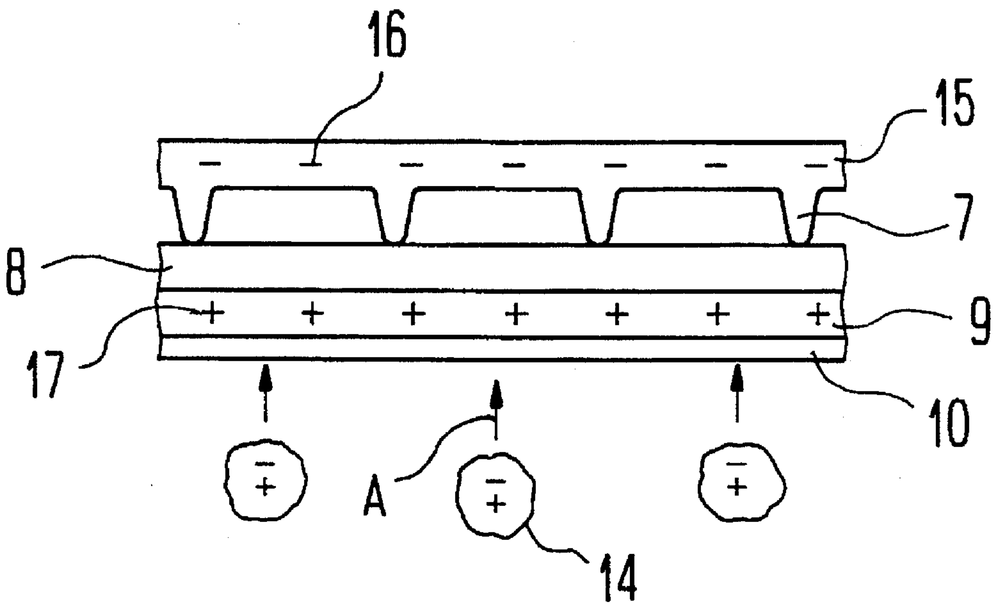
Fig.3a Prior Art
FIGS. 3*a* and 3*b* are diagrams showing the charge distribution in cassettes according to the prior art.
Figure 3B:
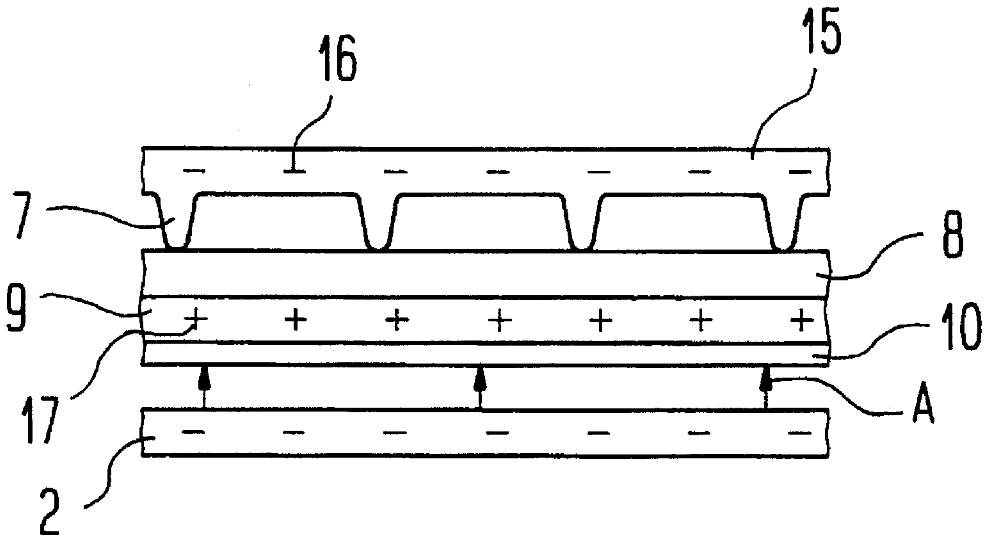
Fig.3b Prior Art

FIGS. 3a and 3b illustrate the problems which exist in conventional x-ray cassettes without the antistatic sheet. Static electricity produced between the lid 15 and materials with different triboelectric properties bring it about that the lid 15, upon contact with these materials, becomes electrostatically charged, negative charges 16 and positive charges 17 being represented symbolically in the figures. The result is that other parts of the lid 1b, like the lead sheet 9 in the figures, also charge electrostatically. When the lead sheet is then touched by something that has a connection to ground (operator, grounded apparatus parts, etc.), charges flow from the lead sheet 9 to ground. The charges 16 on the lid 15, however, are retained. 1f the conductive connection between lead sheet 9 and the ground is interrupted, the lead sheet charges up, as shown in FIG. 3b. Discharges can thus occur from the lead sheet 9 to grounded parts. Dust particles in the vicinity of the lead plate are polarized by the electrical field in the cassette and drawn in direction A to the insulating sheet 10. They adhere there because their polarization remains even when the lid 1b again discharges.

As shown in FIG. 3b, a phosphor sheet 2 is also polarized and drawn to the insulating sheet 10. The result can be that, when the cassette lid 1b is opened, the phosphor sheet 10 may also continue to adhere to the cassette lid 1b. This can result in difficulties in the automatic loading and unloading of the cassettes.

Such electrostatic charges are prevented by the invention. The antistatic synthetic film 6, such as Bayfol VP-KU-3 1011/22-4, cemented on the cassette cover 1b causes the surface conductivity of the cassette cover to increase. Triboelectric or frictional electric charging is thus prevented. The antistatic film can be any kind of antistatic material that is electrically conductive on its surface, e.g., conductive polymers (poly-thiophen or polyaniline derivatives), carbon black, etc. The antistatic film 6 covers more than 20% of the outwardly facing surface of the cassette, and even 80% in the embodiment shown in FIG. 1, of the outwardly facing surface of the cassette cover 1b.

Instead of covering the cassette cover with an antistatic film, it is also possible to admix antistatic substances with the plastic when manufacturing the plastic parts of the cassette. Such antistatics are nonionogenic, cationically active or anionically active substances, or other suitable antistatics. Alternatively, it is possible to provide the cassette with a varnish coat that contains an antistatic substance.

To improve the effect of the invention, it is also possible to bond onto the cassette, instead of or in addition to the plastic film, metal parts 18 or metal foils which are electrically connected to grounded conductors to discharge the cassette. Such metal parts are preferably applied to a side of the cassette facing away from the tube to prevent unwanted images on the sensitive film as shown in FIG. 1. Advantageously, they are electrically connected with the conductive element 6 covering the cassette via connections 19.

There has thus been shown and described a novel x-ray cassette which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In an x-ray cassette for the accommodation of photosensitive material in sheet form, the cassette housing a cover part, a bottom part and side parts joined thereto; the cover part, bottom part and side parts being made of plastic, enclosing the cassette interior in a light-tight manner and forming outwardly facing surfaces, the improvement wherein the cassette has at least one electrically conductive plastic element forming and extending over at least 20% of the surface of the cassette, said plastic element having an electrically conductive surface.

2. The x-ray cassette according to claim 1, wherein the electrically conductive element is an electrically conductive film which is arranged on, and forms a surface on, at least one of the cover part and bottom part.

3. The x-ray cassette according to claim 2, wherein the electrically conductive film is cemented in recesses of at least one of the cover part and bottom part.

4. The x-ray cassette according to claim 2, wherein the electrically conductive film is coplanar with the outwardly facing surfaces of the cover part and bottom part.

5. The x-ray cassette according to claim 1, wherein at least one of the cover part and the bottom part is electrically dissipative.

6. The x-ray cassette according to claim 5, wherein at least one of the cover part and bottom part contains an antistatic substance.

7. The x-ray cassette according to claim 1, wherein the electrically conductive element is conductively connected to a metal contact situated on the cassette.

8. The x-ray cassette according to claim 1, wherein the electrically conductive element is a varnish coat which contains an antistatic substance.

9. The x-ray cassette according to claim 1, wherein the electrically conductive element is disposed on the side of the cassette facing away from the x-ray tube when the cassette is in use.

* * * * *